United States Patent [19]

Ito et al.

[11] 4,249,212
[45] Feb. 3, 1981

[54] TELEVISION PICTURE SPECIAL EFFECTS SYSTEM USING DIGITAL MEMORY TECHNIQUES

[75] Inventors: Yutaka Ito; Yukihiko Isomura; Katsuhisa Kato; Hiroshi Takahashi; Masao Inaba, all of Tokyo, Japan

[73] Assignees: Tokyo Broadcasting System Inc.; Nippon Electric Co., Ltd., both of Tokyo, Japan

[21] Appl. No.: 39,320

[22] Filed: May 16, 1979

[30] Foreign Application Priority Data

May 19, 1978 [JP] Japan .................................. 53-60227

[51] Int. Cl.³ ............................................. H04N 5/22
[52] U.S. Cl. .................................. 358/183; 358/105; 358/22
[58] Field of Search .......................... 358/183, 22, 105

[56] References Cited
U.S. PATENT DOCUMENTS 4,168,510  9/1979  Kaiser .................................. 358/183
4,214,263  7/1980  Kaiser .................................. 358/183

OTHER PUBLICATIONS

*SMPTE Journal*, Oct. 1978, vol. 87, No. 10, pp. 673–676, Moore et al. "The CBS Action Track" TM System.

*Primary Examiner*—Howard W. Britton
*Attorney, Agent, or Firm*—Hopgood, Calimafde, Kalil, Blaustein & Lieberman

[57] ABSTRACT

A television strobe effects system is described in which a position information signal representing the position of a moving object included in a television picture is extracted from either the input video signal or the sample-to-sample comparison between successive frames or fields of the input video signal. The write-in of the input video signal in a picture memory is controlled in response to the position information signal so that such write-in for each frame of the input video signal is prohibited at those addresses of the memory which correspond to the position of the moving object.

6 Claims, 18 Drawing Figures

TELEVISION PICTURE SPECIAL EFFECTS SYSTEM USING DIGITAL MEMORY TECHNIQUES

This invention relates to a television picture special effects system for displaying a trajectory of moving objects in an otherwise static scene, and more particularly to a television strobe effects system for producing a video signal representing not only the present image of the moving object but also a selectable succession of earlier images.

Various television production techniques are employed in the production of telecast programs. Television production techniques are available for displaying various special motions, such as slow motion, stop motion and progressive stop motion. In order to provide strobe effects for moving objects in accordance with the conventional television production techniques, photographic systems have been used that employ stroboscopic techniques using high-speed flash lighting. However, since stroboscopic photography requires a long time to process the film, these photographic techniques are not practically applicable for use in the production of many television programs such as a telecast of a sports event.

To eliminate the long time required in film processing, an electrical system has been proposed in which difference signals representative of the differences in amplitude between adjacent fields or frames are successively stored in storage means for plural frames, and then the stored video signals are simultaneously reproduced for display in the single picture (as disclosed in Japanese Patent Publication No. 51-12369). This electrical system, however, is not practical due to the deterioration in the S/N ratio of the simultaneously reproduced difference signals and the impossibility of providing an intact display of colored moving objects.

It is, therefore, an object of this invention to provide a television strobe effects system in which video signals with strobe effects with respect to moving objects can be produced on a real time basis.

It is another object of this invention to provide a television strobe effects system for displaying a trajectory of colored moving objects in which the color is kept intact.

According to this invention, a television strobe effects system is provided in which position information representing the position of a moving object included in a television picture is extracted either from the input video signal or from the sample-to-sample comparison between every two successive frames or fields of the input video signal. The write-in of the input video signal in a one-frame or one-field picture memory is controlled in response to the position information so that the write-in for each frame of the input video signal is prohibited at those addresses of the memory which correspond to the position of the moving objects. This permits the signal segment representative of the moving object to replace, for each frame, the input video signal segment at the corresponding addresses of the picture memory, while allowing other portions of the input video signal to be stored in the memory unaltered. When successively read out at a standard television scanning rate, the picture memory provides a video signal including in each frame the moving-object-representing signal segment, thereby giving the desired strobe effect.

In contrast to the conventional system of this kind, which has a memory for the frame-to-frame difference signal separated from the picture memory, the system of the present invention requires only one picture memory, with the difference signal being used only for the extraction of the position information.

Other features and advantages of this invention will be apparent from the following description of preferred embodiments of this invention taken in conjunction with the accompanying drawings, wherein:

In the following description of the invention, input signals are assumed to be 8-bit pulse-code-modulated (PCM) video signals which have been produced by sampling and quantizing NTSC analogue composite video signals in response to sampling pulses having a sampling frequency of 10.74 MHz.

Figure 1:
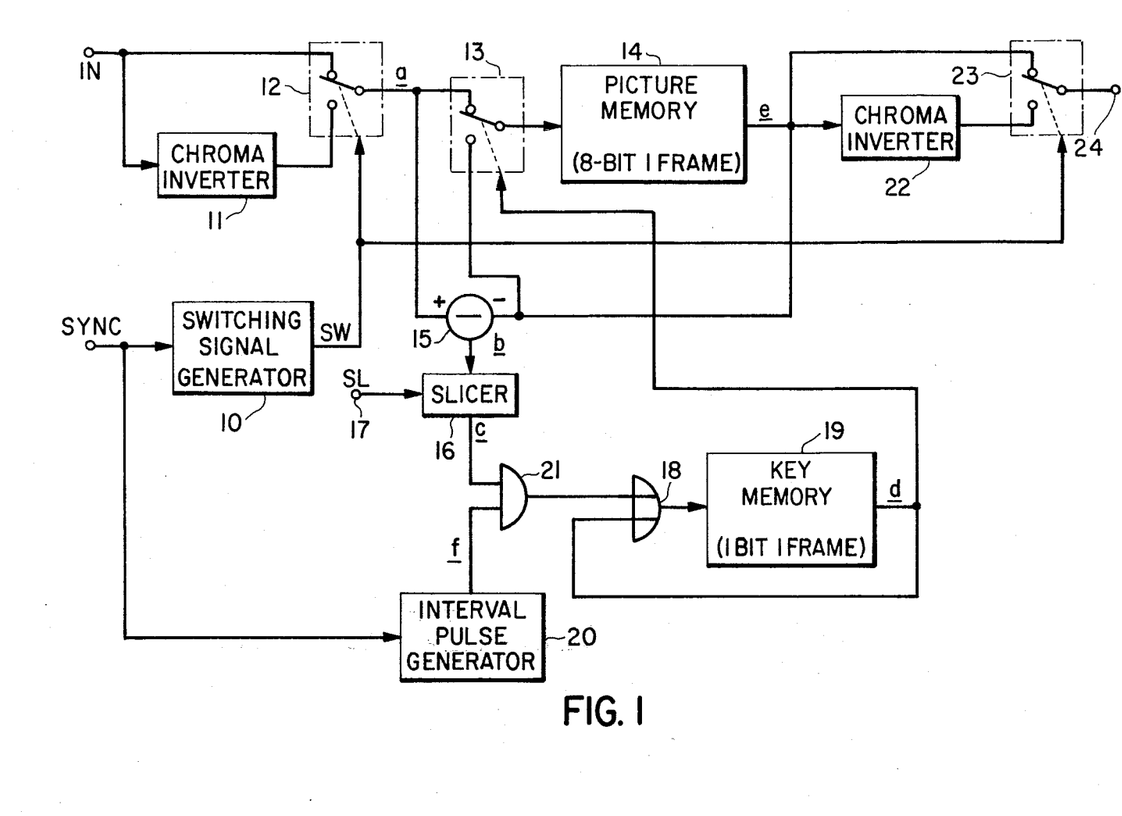
FIG. 1 is a block diagram of television strobe effects system according to a first embodiment of this invention.

Referring to FIG. 1, the PCM video signal fed from an input terminal IN is supplied directly and through a chroma-inverter 11 to a first switch 12. In the NTSC color television signal, the subcarrier phases between adjacent frames are different from each other by 180°. In order to provide a frame-phase-compensated video signal having the subcarrier in phase for every frame, a switching signal generator 10, the chroma inverter 11 and the first switch 12 are employed. The switching signal generator 10, which is supplied with the vertical synchronizing signal SYNC separated from the NTSC analogue composite video signal, generates a switching signal SW having a repetition period equal to two frames (1/15 second) and having a pulse width of one frame (1/30 second). The first switch 12 is driven by the switching signal SW, thereby to provide the frame-phase-compensated video signal a at its output. The frame-phase-compensated video signal a is supplied through a second switch 13 to a picture memory 14 for storage therein, which has a capacity of one frame of the 8-bit PCM video signal, i.e., about 2.86 mega-bits, and then stored therein.

On the other hand, the frame-phase-compensated video signal a is also supplied to a subtractor 15, which is supplied with a preceding video signal e stored in and read out from the picture memory 14. The subtractor 15 subtracts the preceding video signal e from the frame-phase-compensated video signal a to produce a difference signal b having a level X representative of the frame-to-frame change in signal level. The difference signal b is supplied to a slicer circuit 16, which is also supplied from a terminal 17 with a slice level signal SL representative of slice level sl. The slicer circuit 16 provides a one-bit pulse c of logic "1" for each sample of the PCM video signal when the absolute value |X| of the difference signal b is greater than the slice level sl (|S| ≧ sl), i.e., when the frame-to-frame change in signal level is greater than the slice level sl. The slice level sl is so determined by the slice level signal SL that a moving object, for which the strobe effect is to be provided, can be detected. The slicing of the difference signal b at the slice level sl is intended to prevent noise and slight movement in the background objects of low signal level from affecting the strobe effect for the moving object.

Thus, the slicer circuit 16 provides a one-bit pulse c for every sample point which shows an above-the-slice-level change when compared with the corresponding sample in the immediately preceding frame. The time point of the detection of the moving object in each frame corresponds to the position of the moving object on the screen. This means that the one-bit pulse c represents the position information of the moving object on the screen.

The one-bit pulse c, i.e., the position information signal of the moving object is supplied through an OR circuit 18 to a key memory 19 for storage therein. Key memory 19 has a capacity of about 358 K bits, i.e., one bit for every sample contained in one frame of the video signal. The position information signal d read out from the key memory 19 is fed through the OR circuit 18 and is then again written in the key memory 19, such that rewriting of the position information signal d is performed. Therefore, the position information signal d is successively stored at those addresses in the key memory which correspond to the positions of the moving object on the successive frames. It follows, therefore, that a series of the position information signals representing the trajectory of the moving object are stored in the key memory 19.

In the above foregoing description of the embodiment of FIG. 1, the write-in of the one-bit pulse c from the slicer circuit 16 to the key memory 19 is performed for every frame. If, however, the motion of the moving object is so slow that the stored position information signals for adjacent frames cannot be separated from each other when stored in the key memory 19, the desired strobe effect is deteriorated. For example, in the case where the moving object is a ball moving too slowly, a thick white line may be formed on the screen, rather than a chain of white balls, along the trajectory of the ball. To solve this problem, the strobe effects system of the first embodiment comprises an interval pulse generator 20 and an AND circuit 21. The interval pulse generator 20, which is supplied with the vertical synchronizing signal SYNC, generates an interval pulse f having a pulse width of one frame and having a repetition period equal to the frame period multiplied by an integer n. The repetition period of the interval pulse f is determined in accordance with the speed and size of the moving object. The interval pulse f is supplied to the AND circuit 21 which is supplied also with the one-bit pulse c from the slicer circuit 16, whereby the one-bit pulse c is fed through the AND circuit 21 for one frame period for every n frames. Thus, the position information is written in the key memory 19 once (for one frame period) for every n frames leaving the same position information for the rest of the n frames unwritten.

The position information signal d from the key memory 19 is supplied to the second switch 13 to control the operation of switch 13. More specifically, the second switch 13 allows the frame-phase-compensated video signal a to pass therethrough to the picture memory 14 so long as the position information signal d is in the logic "0" condition. When the position information signal d is in the logic "1" condition, the switch 13 is switched downward to allow the stored video signal e to pass therethrough to the picture memory 14 so that rewriting of the stored video signal is performed. Thus, the video signal segments designated by the position information signal d are repeatedly stored in the picture memory 14, replacing the corresponding picture segments in the incoming video signal a. The trajectory information stored in the picture memory 14 is continued to be stored as long as the position information signal d in the key memory 19 is not erased.

The video signal e from the picture memory 14 is supplied directly or through a chroma inverter 22 to a third switch 23 driven by the switching signal SW supplied from the switching signal generator 10. The chroma inverter 22 and the third switch 23 are identical to the chroma inverter 11 and the first switch 12, respectively, and perform the reverse phase-compensation to the latter to provide the NTSC PCM video signal at a terminal 24.

Figure 2A:
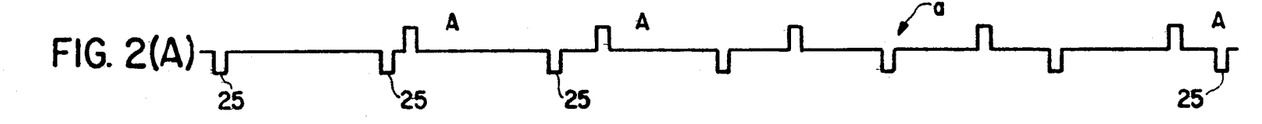
FIGS. 2(A) to 2(E) and FIGS. 3(A) to 3(E) are waveform diagrams of signals appearing at various parts of the embodiment shown in FIG. 1.
Figure 2B:
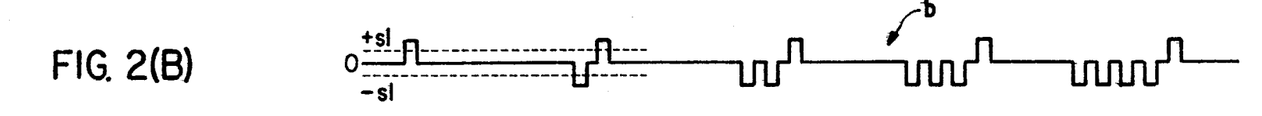
Figure 2C:
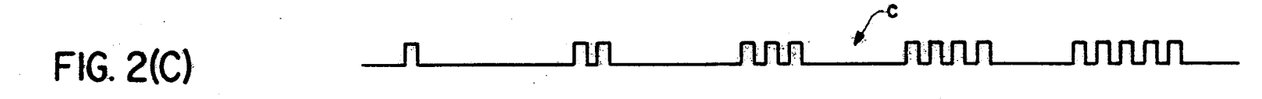
Figure 2D:
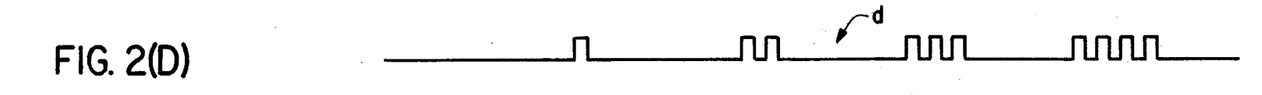
Figure 2E:
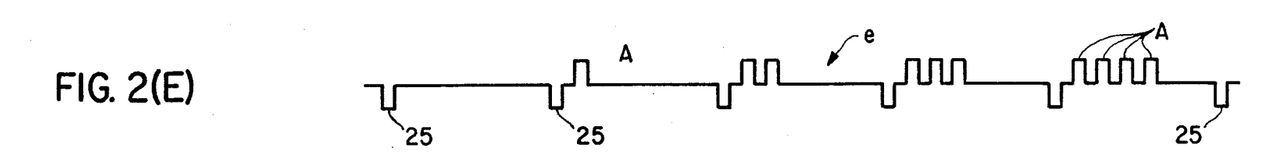

The operation of the first embodiment will be described in detail with reference to FIGS. 2 and 3. FIG. 2(A) shows in analogue fashion the frame-phase-compensated video signal a, in which the vertical synchronizing signal 25 is shown at the frame interval for simplicity. As clearly understood from FIG. 2(A), the moving object A moves to the right with the lapse of time. FIG. 2(B) is a waveform diagram of the difference signal b whose absolute value is sliced by the slicer circuit with respect to the slice level sl to produce the one-bit pulse c as shown in FIG. 2(C) when the difference signal level in absolute value is greater than the slice level sl. The pulse c is supplied to the key memory 19, from which the position information signal d as shown in FIG. 2(D) is obtained. The position information signal d controls the second switching means 13 whereby the stored video signal e, as shown in analogue fashion in FIG. 2(E) is obtained from the picture memory 14. Thus, the strobe effect picture with the trajectory of the moving object A can be obtained. Incidentally, the background signal and noise components which have level fluctuations lower than the slice level are displayed intact.

Figure 3A:
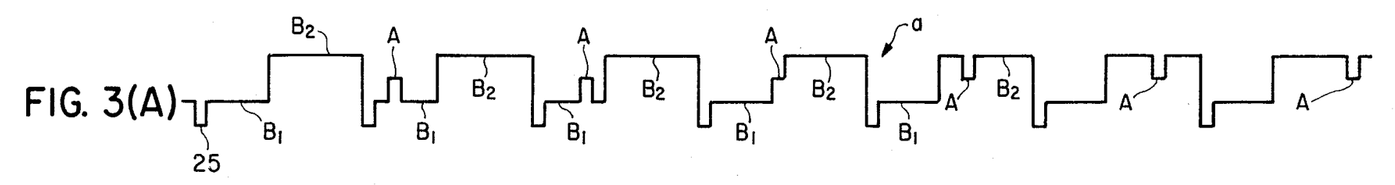
Figure 3B:
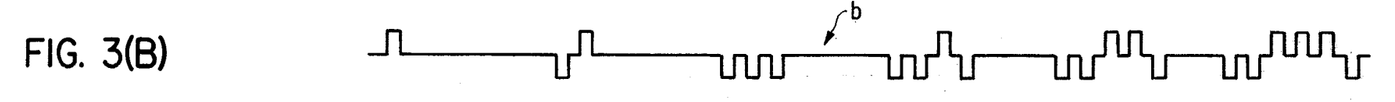
Figure 3C:
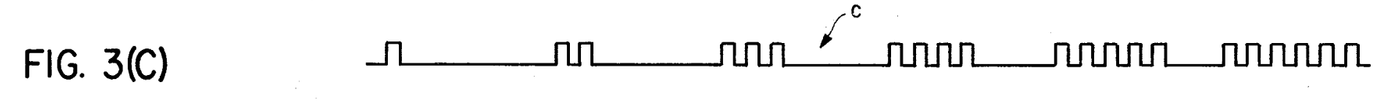
Figure 3D:
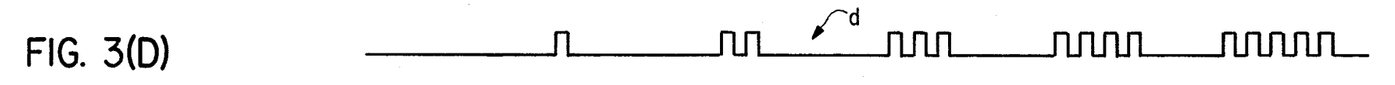
Figure 3E:
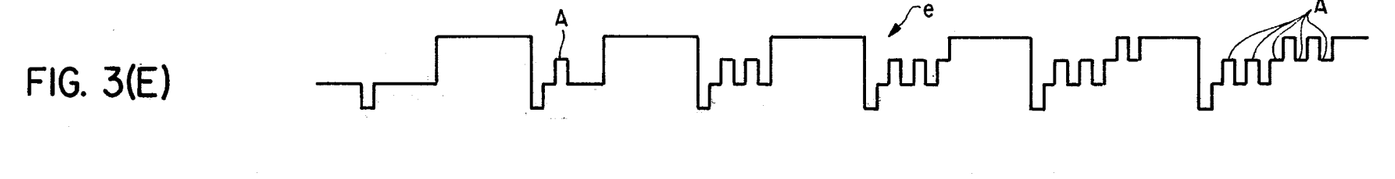

The embodiment of the invention thus far described comprises the key memory 19 for storing the position information of the moving object. It is, therefore, possible to obtain the strobe effect regardless of the polarity of the moving-object-representing signal level with respect to the background signal level, as shown in FIGS. 3(A) to 3(E), which correspond to FIGS. 2(A) to 2(E), respectively. In FIG. 2(A), the level of the moving-object-representing signal level A is in the middle of the levels B₁ and B₂ of the background. In this case, the output signal e as shown in FIG. 3(E) can be obtained. As described above, it is possible for the embodiment of FIG. 1 to obtain strobe effects so long as the level of the moving object is different from the background level by at least the slice level.

Figure 4:
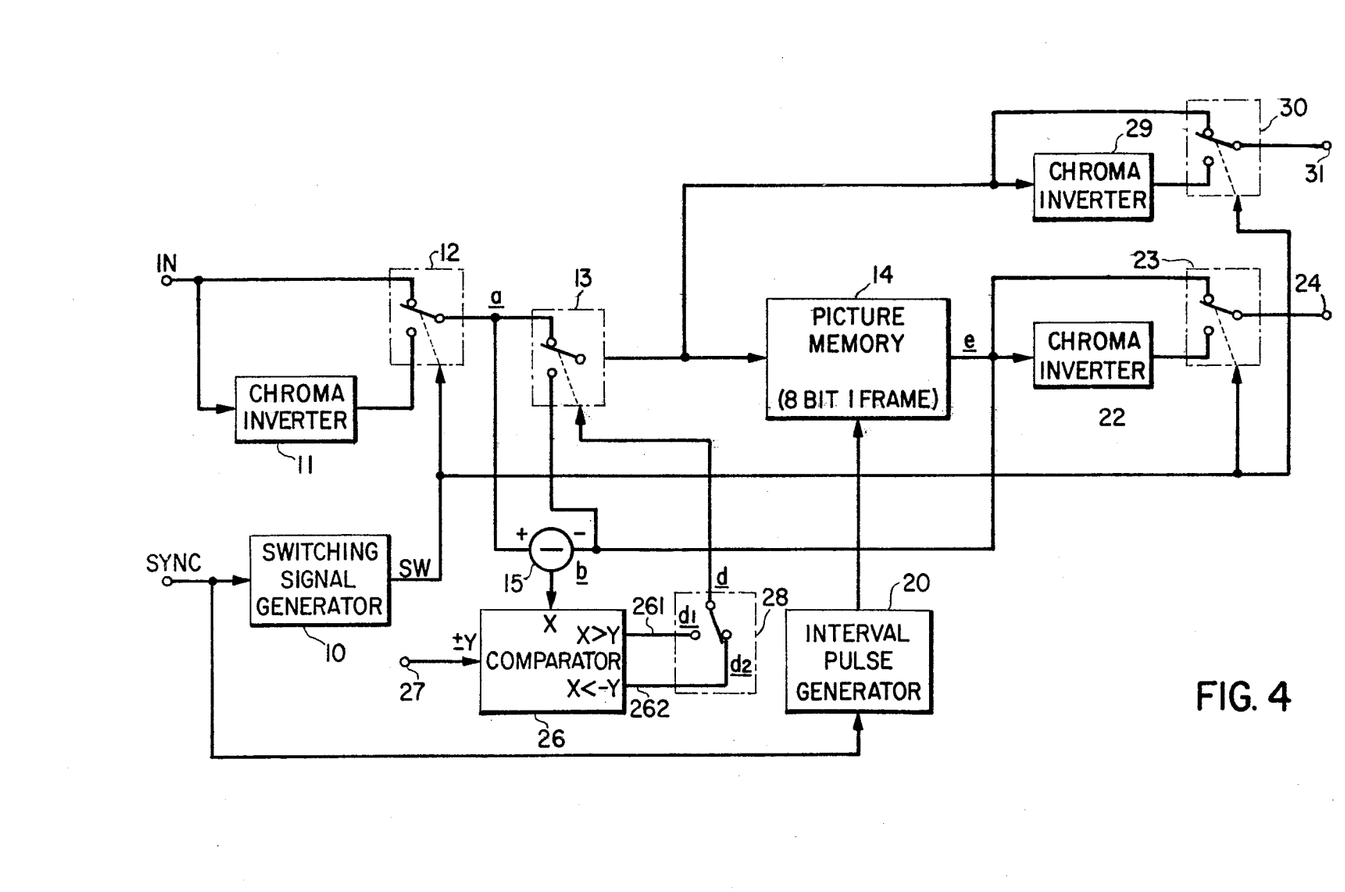
FIG. 4 is a block diagram of television strobe effects system according to a second embodiment of this invention.

FIG. 4 illustrates schematically a second embodiment of this invention, in which the elements designated by like reference numerals as in FIG. 1 are identical to those in the first embodiment.

In the embodiment of FIG. 4, the difference signal b is supplied from the subtractor 15 to a comparator 26 which is supplied with a reference level signal having levels ±Y from a terminal 27. The comparator 26 compares the difference-signal level X with the levels ±Y and provides pulse signals $d_1$ and $d_2$ at terminals 261 and 262 when $X > Y$ and $X < -Y$, respectively. The pulse signals $d_1$ and $d_2$ are supplied to a fourth switch 28 whose switching operation is manually driven in response to the polarity of the signal level of the moving object with reference to the background level. In other words, the switching means supplies the signals $d_1$ and $d_2$ as the position information signal d to the second switching means 13 when the level of the moving object is less than the background level and vice versa, respectively.

Figure 5A:
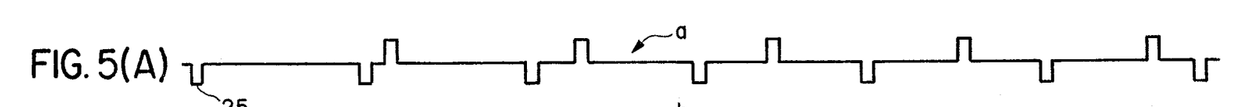
FIGS. 5(A) to 5(D) are waveform diagrams of signals appearing at various parts of the embodiment shown in FIG. 4.
Figure 5B:
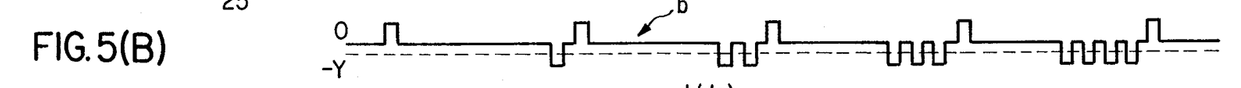
Figure 5C:
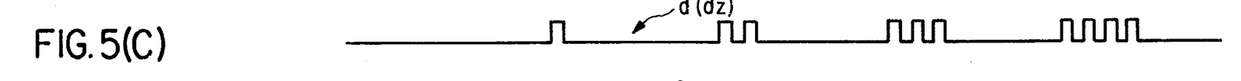
Figure 5D:
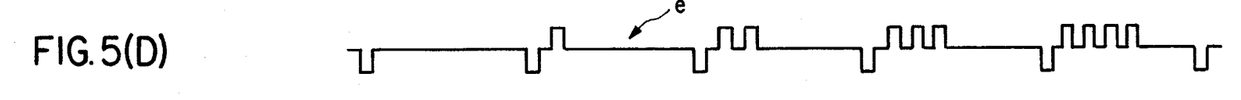

FIG. 5 shows the waveforms of the signals appearing at various parts of the embodiment of FIG. 4 for the case in which the moving-object-representing signal level is higher than the background signal level, as shown in FIG. 5(A), and the fourth switch 28 selects the terminal 262 to supply the signal $d_2$, as shown in FIG. 4. The video signal a as shown in FIG. 5(A) is supplied to the subtractor 15 to produce the difference signal b, as shown in FIG. 5(B). The difference signal b is supplied to the comparator 26 to produce the signal $d_2$ as shown in FIG. 5(C) at the terminal 262. The signal $d_2$ is supplied as the position information signal d to the second switch 13 to control the write-in of the video signal a. Thus, the video signal e, as shown in FIG. 5(D), is obtained at the output of the picture memory 14.

The embodiment of FIG. 4 further comprises the interval pulse generator 20, which supplies the interval pulse f as the write enable pulse to the picture memory 14 for controlling the strobe period. In the case in which the write-in is performed once (for one frame period) for every several frames, the reproduced picture becomes unnatural to the eyes of a person watching the picture, in which the background involves intermittent changes in brightness. To obtain a natural-looking output picture, another combination of a chroma inverter 29 and a fifth switch 30 is additionally employed. The chroma inverter 29 and the fifth switch 30 are identical to the chroma inverter 22 and the third switch 23, respectively, except that the input signal rather than the output signal e of the picture memory 14 is applied thereto. Thus, a video signal representative of a natural-looking picture is obtained at a terminal 31.

Figure 6:
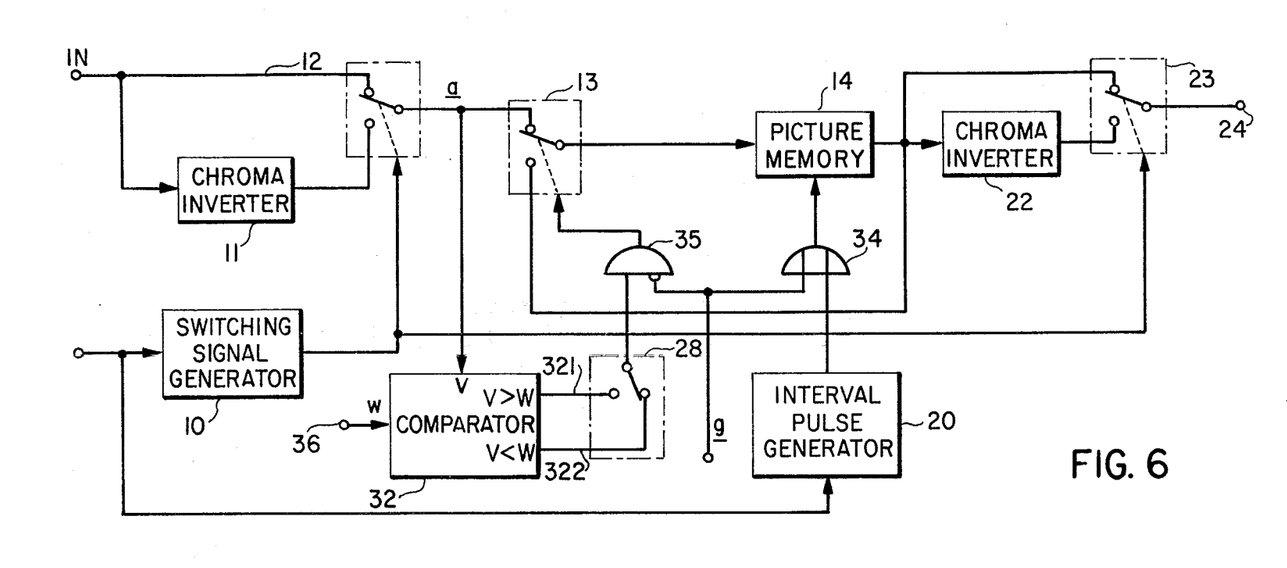
FIG. 6 is a block diagram of television strobe effects system according to a third embodiment of this invention.

The third embodiment of this invention, as shown in FIG. 6, does not comprise the subtractor. In this embodiment, the position information is extracted at a comparator 32 directly from the video signal a supplied from the switch 12.

At the start of the operation, a start pulse g having a pulse width of one frame is supplied from a terminal 33 through an OR circuit 34 to the picture memory 14 as the write enable signal. The start pulse g is also supplied to an inhibit circuit 35, whereby the supply of the position information signal d to the switch 13 is inhibited for one frame period. Therefore, the video signal a of one frame is supplied to the picture memory 14 and stored therein as the starting picture. Then, the comparator 32, which is supplied with a reference level signal having a reference level W from a terminal 36, compares the level V of the video signal a with the reference level W. The comparator 32 provides a pulse signal at terminals 321 and 322 when $V < W$ and $V > W$, respectively. The switch 28 connects its output terminal to the terminals 321 and 322 when the level of the moving object is less than the background level and vice versa, respectively.

Figure 7:
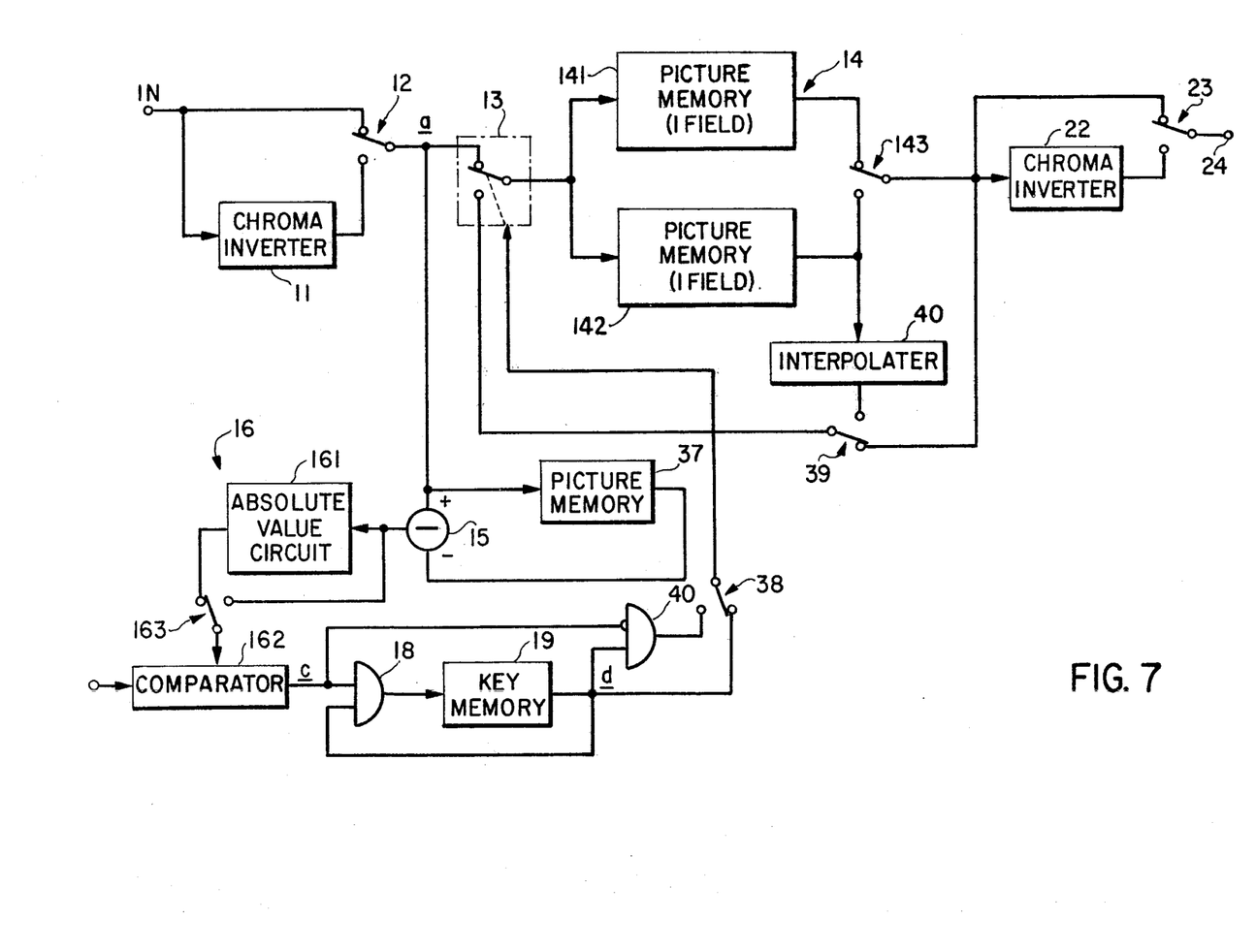
FIG. 7 is a block diagram of television strobe effects system according to a fourth embodiment of this invention.

In the fourth embodiment of this invention, as shown in FIG. 7, the picture memory 14 is composed of two one-field memories 141 and 142 and a switch 143 which is driven at the field period. The slicer circuit 16 is composed of an absolute value circuit 161, a comparator 162 and a switching means 163. The embodiment of FIG. 7 further comprises a second picture memory 37 for storing the start video signal which is supplied to the subtractor 15. The second picture memory 37 writes in the start video signal at the start of the operation and then the write-in is inhibited.

In the case in which the movable contacts of the switches 38 and 39 are positioned as indicated in FIG. 7, the embodiment illustrated in FIG. 7 functions in a similar manner to the embodiment of FIG. 1. When the movable contact of the switch 38 is connected to the output of an inhibit circuit 40, the position information signal d is inhibited by the pulse signal c. This makes it possible to write the video signal a in the picture memory 14 so long as the pulse signal c is present. In this case, even when the pulse signal c is overlapped with the position information signal d in the time domain, the video signal a for the overlapping period can be written in the picture memory 14, although this write-in is not possible in the embodiment of FIG. 1.

When the movable contact of the switch 163 is connected to the output of the subtractor 15, the embodiment of FIG. 7 functions in a manner similar to the second embodiment.

In the case in which the moving object moves rapidly on the picture, the position of the moving object is different for each field. This results in flicker on the picture. To solve this problem, the embodiment of FIG. 7 provides the one field picture memory output once for every two fields (one frame) by bringing the movable contact of the switch 39 into contact with the interpolator 40, so that an even field video signal, for example, is produced from the readout of the stored odd field video signal. The strobe effect video signal produced from the odd field video signal stored in the memory 142 is stored in the memory 141 for even field. Thus, the strobe effect signal in one frame is stored at the same position in both of the field memories 141 and 142, whereby the reproduced picture does not include any flicker.

In the various embodiments of the invention described above, the memories 14, 19 and 37 can be driven in common by the address signal synchronized with the input video signal. For simplicity of description, the means for producing the address signal is omitted. Further, as understood from the foregoing description of the various embodiments of the invention, each of the memories 14, 19 and 37 operates in a manner similar to a shift register, such that the former may be replaced with the latter.

Because the memories 14, 19 and 37 have the capacity of one frame, the input NTSC color video signal is converted to the frame-phase-compensated video signal a by the combination of the chroma inverter 11 and the switch 12, and the output signal e is converted back to the NTSC color video signal by the combination of the chroma inverter 22 and the switch 23. When a one-field memory is employed to replace each of the memories 14, 19 and 37, the input NTSC color video signal must be converted into the field-phase-compensated video signal, which is then converted back to the NTSC video signal after the read-out from the field memory.

An NTSC color video signal has the same phase relationship for the synchronizing signal and color subcarrier for every four fields. Therefore, with respect to the first field phase relationship, the second, third, and fourth field segments of the video signal are converted to satisfy the first field phase relationship. This conversion is achieved by a combination of: means for passing directly the first field segment; means for subjecting the second field segment to a line interpolation; means for subjecting the third field segment to the chroma inversion; means for subjecting the fourth field segment to the line interpolation and the chroma inversion; and means for combining the outputs of these means.

What is claimed is:

1. A television picture special effects system for a television video signal, said television signal representing a picture including a moving object, said system comprising:
   means for storing said television video signal for a period equal to at least one field of said television signal;
   means for developing a position information signal representative of the position of said moving object in said picture; and
   means operatively connected to said storing means and said signal-developing means for inhibiting the write-in of said television video signal into said storing means and for allowing the previously stored television video signal to pass to said storing means in response to said position information signal.

2. The special effects system of claim 1, in which said controlling means comprises switch means operatively connected to said storing means and controlled by said position information signal.

3. The special effects system of claim 2, in which said signal-developing means comprises means for comparing a previously stored video signal and an input video signal and producing said positional information signal when the magnitude of the former bears a predetermined relation to that of the latter.

4. The special effects system of claim 3, in which said signal-comparing means comprises means for obtaining a signal corresponding to the difference between said stored video signal and said input video signal, and means for comparing the absolute value of said difference signal with a reference signal.

5. The special effects system of claim 4, further comprising a second storing means operatively arranged between said absolute value comparing means and said switch means for storing said position information signal at addresses therein corresponding to the positions of the moving object in successive frames of the video signal.

6. The special effects system of claim 5, further comprising a pulse generator for generating an interval pulse having a pulse width of one frame and a repetition period equal to the frame period multiplied by an integer n, and gating means having an output coupled to said second storing means and receiving at its inputs the output of said absolute-value comparing means and said interval pulse.

* * * * *